(12) United States Patent
Lodge

(10) Patent No.: US 6,851,546 B2
(45) Date of Patent: Feb. 8, 2005

(54) CHAIN WEAR MONITORING METHOD AND APPARATUS

(75) Inventor: Christopher James Lodge, Glossop (GB)

(73) Assignee: Renold PLC (GB)

(*) Notice: Subject to any disclaimer, the term of this patent is extended or adjusted under 35 U.S.C. 154(b) by 0 days.

(21) Appl. No.: 10/817,123

(22) Filed: Apr. 2, 2004

(65) Prior Publication Data

US 2004/0226805 A1 Nov. 18, 2004

(30) Foreign Application Priority Data

Apr. 5, 2003 (GB) .............................................. 0307981

(51) Int. Cl.[7] .............................................. B65G 43/00
(52) U.S. Cl. ................................ 198/502.1; 198/810.04
(58) Field of Search .......................... 198/502.1, 502.4, 198/810.01, 810.02; 73/828

(56) References Cited

U.S. PATENT DOCUMENTS

| | | | |
|---|---|---|---|
| 4,106,005 A | | 8/1978 | Asakawa |
| 4,372,172 A | * | 2/1983 | Gombocz et al. ...... 198/810.04 |
| 5,079,729 A | * | 1/1992 | Nowakowski ........... 198/502.1 |
| 5,291,131 A | * | 3/1994 | Suzuki et al. ................ 324/206 |
| 5,563,392 A | | 10/1996 | Brown et al. |

FOREIGN PATENT DOCUMENTS

| | | |
|---|---|---|
| DE | 3524338 | 1/1987 |
| GB | 1 484 954 | 9/1977 |
| GB | 2 377 918 | 1/2003 |
| JP | 59078007 | 5/1984 |
| JP | 1022714 | 1/1989 |
| JP | 130402 | 5/1990 |
| JP | 241072 | 8/2002 |
| SU | 1063739 | 12/1983 |

\* cited by examiner

*Primary Examiner*—James R. Bidwell
(74) *Attorney, Agent, or Firm*—Michael Best & Friedrich LLP

(57) ABSTRACT

A method and apparatus for automatically monitoring the wear of a chain when in operation in a chain drive assembly. First and second markers are applied to the chain at a predetermined distance apart. A first sensor is disposed adjacent to the chain to coincide with the position of the first marker. A second sensor is disposed adjacent to the chain to coincide with the position of the second marker. The sensors generate signals in response to the detection of the markers. When the chain drive is operated the first and second sensors are initially triggered substantially simultaneously by said first and second markers respectively. After the chain extends through wear elongation is identified by detecting a time delay between the triggering of the first and second sensors by the respective markers. One of the sensors is then moved to a position where substantially simultaneous triggering of the sensors by the markers can be resumed. The distance the sensor has to be moved is measured to determine the elongation length of the chain.

13 Claims, 2 Drawing Sheets

CHAIN WEAR MONITORING METHOD AND APPARATUS

Figure 1:
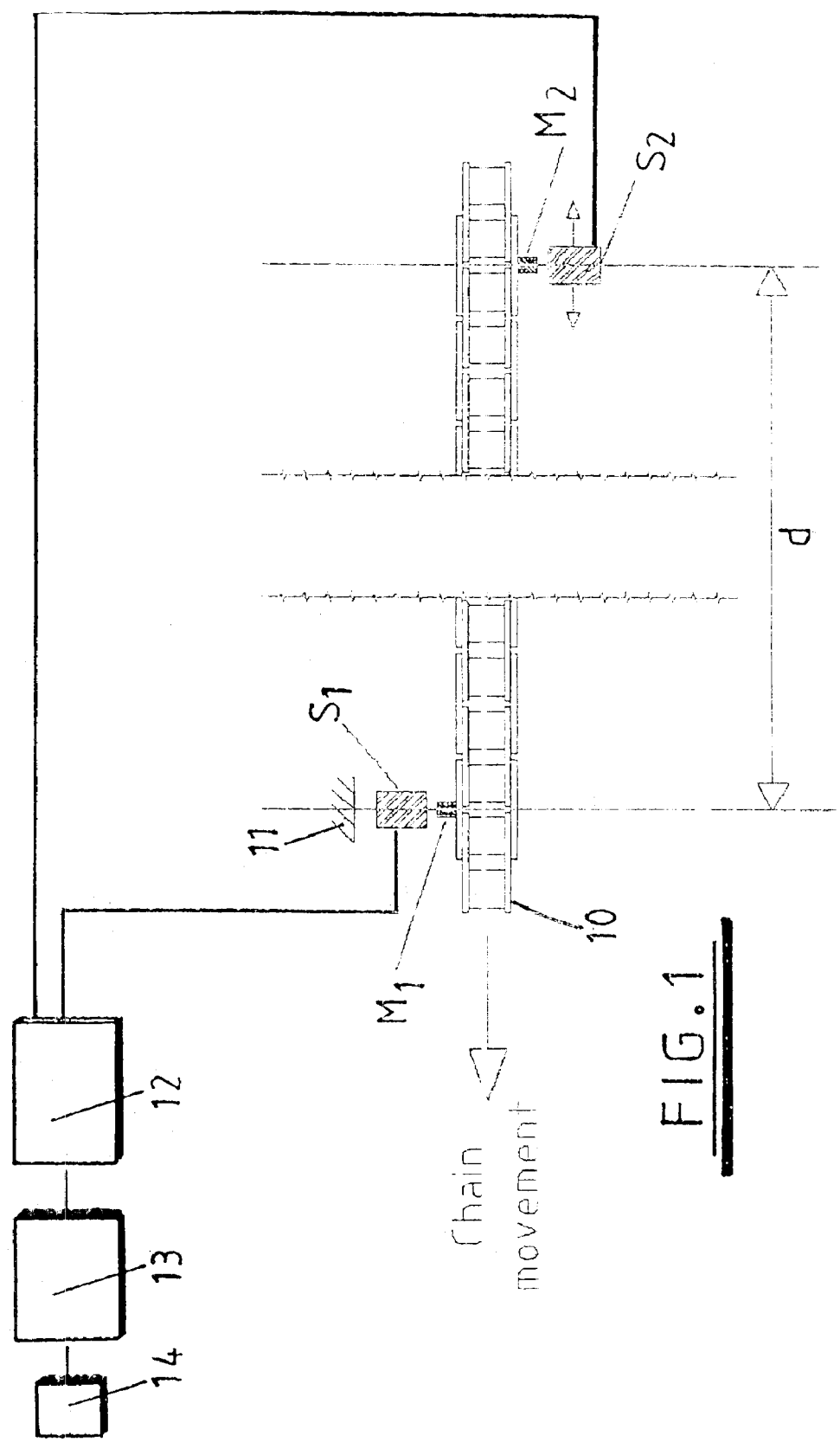

The present invention relates to a chain wear monitoring method and apparatus.

Chain drive assemblies are used in many applications such as, for example, in conveyor systems of manufacturing production lines, in transportation systems such as escalators, elevators or leisure rides (roller coasters etc.), and in internal combustion engines for vehicles. In many applications multiple strands of chain will be used in a single drive assembly.

A chain drive assembly typically comprises at least one endless loop chain that passes around spaced wheels one of which is driven in rotation so as to circulate the chain and any components connected thereto. A chain typically comprises a plurality of chain link assemblies that are interconnected by pins passing through overlapping apertures in adjacent link assemblies.

Over a period of use, a chain will be subjected to wear by virtue of the rubbing friction between adjacent link assemblies and between the pins and the link assemblies. This wear results in elongation of the chain and eventually the chain will have to be replaced to avoid failure of the drive assembly. The rate of wear of a chain is dependent on the nature of the drive assembly in which it is fitted, the loads to which it is subjected and the environment in which it operates. Failure cannot therefore be predicted with any certainty and regular visual inspection and/or manual measurement is required. This is obviously undesirable. Not only is it is labour intensive and imprecise but it also requires operation of the chains drive assembly to be temporarily interrupted, something which is inefficient in a production environment.

U.S. Pat. No. 5,490,590 describes a chain wear monitor in which the length of a section of a chain is measured during regular operation of the chain drive system. The monitor comprises a wheel that is brought into frictional engagement with the chain. The wheel is mounted on a shaft that is connected to an encoder by a flexible coupling. The encoder translates rotational movement of the shaft into an electrical signal that is passed to a controller for processing. At the same time, the presence of each chain link is detected by a proximity sensor as it passes a predetermined location. The sensor generates a count signal that is passed to a controller for processing. The controller calculates from the distance and count signals a distance measurement per preselected number of chain links. This arrangement has to be incorporated into the chain drive system and is prone to inaccuracies caused by relative slip between the friction wheel and the chain.

Our co-pending UK patent application no. 0117993.6 describes a chain wear monitoring system in which two proximity sensors disposed at a fixed distance apart are used to detect the passing of markers attached to a chain that is in operation. A timer measures the elapsed time for a given marker to pass between the two sensors so as to determine the speed of travel of the chain. The timer also measures the time that elapses between a first of the markers passing a given sensor and a second of the markers passing a given sensor. The distance between the markers can be calculated from the measured elapsed time and the calculated speed of the chain. The chain elongation is then calculated from the difference between this distance and the original distance between the markers. This monitoring system works well but is only suited for applications in which the chain drive operates at a constant speed.

It is an object of the present invention to obviate or mitigate the aforesaid disadvantage and to provide for an improved method and apparatus for automatically monitoring the wear of a chain in-situ.

According to a first aspect of the present invention there is provided a method for automatically monitoring the wear of a chain when in operation in a chain drive assembly, comprising the steps of applying first and second markers to the chain at a predetermined distance apart along the length of the chain, positioning a first sensor adjacent to the chain to coincide with the position of the first marker, positioning a second sensor adjacent to the chain to coincide with the position of the second marker, the sensors being capable of generating signals in response to the detection of the proximity of the markers, operating the chain drive assembly so that the first and second sensors are initially triggered substantially simultaneously by said first and second markers respectively, detecting elongation of the chain by determining when a predetermined time delay occurs between the triggering of the first and second sensors by the respective markers, moving at least one of the sensors to resume substantially simultaneous triggering of the sensors by the markers and measuring the distance the sensor is moved to determine the elongation length of the chain.

According to a second aspect of the present invention there is provided chain wear monitoring apparatus for automatically monitoring the wear of a chain when in operation in a chain drive assembly, the apparatus comprising: first and second sensors mounted on a support, first and second markers disposed at a predetermined distance apart along the length of the chain, the first sensor being disposed adjacent to the first marker and the second sensor being disposed adjacent to the second marker, the sensors each being capable of generating a signal in response to the detection of the proximity of a marker, means for detecting a time delay between the first sensor being triggered by said first marker and the second sensor being triggered by said second marker, at least one of the sensors being movable to a position where substantially simultaneous triggering of the sensors by the markers is resumed, means for measuring the distance the sensor is moved so as to determine the elongation length of the chain.

Figure 2:
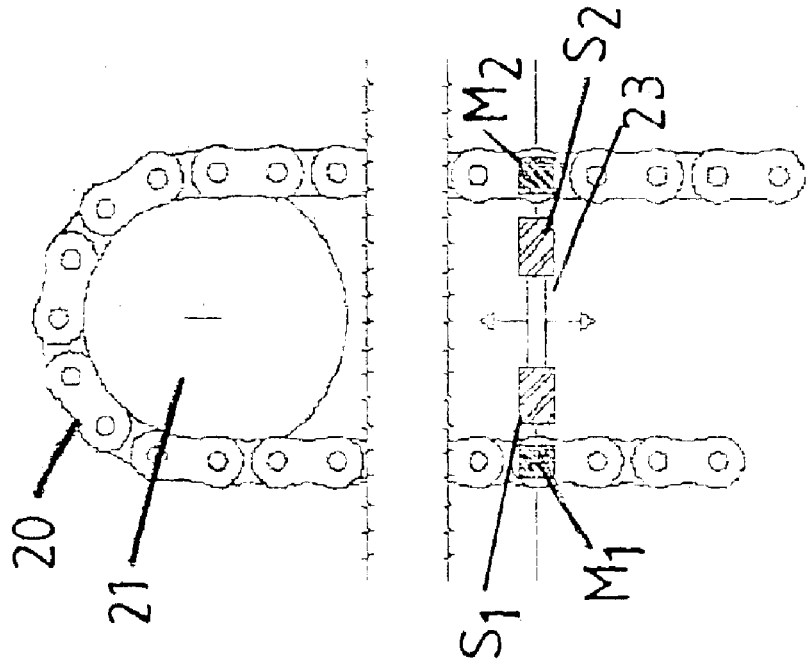
Figure 3:
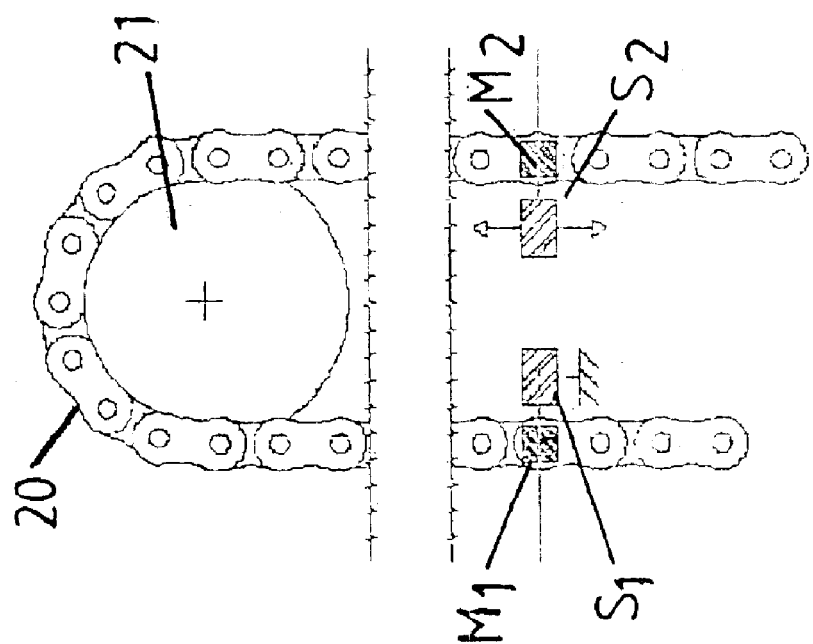

Specific embodiments of the present invention will now be described, by way of example only, with reference to the accompanying drawings in which:

FIG. 1 is a schematic representation of the chain wear monitoring apparatus applied to part of a chain of a chain drive assembly;

FIG. 2 is a schematic representation of an alternative embodiment of the present invention being used with a lifting chain; and FIG. 3 is a schematic representation of a further alternative embodiment of the present invention being used with a lifting chain Referring first to FIG. 1, the exemplary chain wear monitoring apparatus comprises a pair of inductive or Hall-effect sensors $S_1$, $S_2$ disposed near to the chain 10 at a fixed distance d apart in the direction of travel of the chain (right to left in FIG. 1). The middle portion of the chain is omitted so that the figure can be fitted on to the page. The sensors are disposed on opposite sides of the chain with one, $S_1$, fixed to a stationary support structure 11 such as, for example, a framework that carries the chain drive assembly and the other, $S_2$, supported such that it is moveable in the longitudinal direction of the chain. The sensors $S_1$, $S_2$ are connected to a control unit 12 that receives and processes the signals from the sensors $S_1$, $S_2$ and generates output signals that drive a visual display 13 and an audio unit 14.

The control unit 12 comprises conventional signal conditioning circuitry, a timer, a processor with associated memory, and an output circuit for driving the visual display 13 and/or an audio unit 14.

The chain 10 is fitted with two markers $M_1$, $M_2$ that are composed of a material to which the sensors are sensitive (e.g. magnetic elements) and are disposed initially at the predetermined distance d apart. The markers $M_1$, $M_2$ may simply clip or otherwise fasten directly or indirectly on to the chain. When the chain is in use an electrical signal is generated by each sensor as each marker $M_1$, $M_2$ passes in front of it and the signal is passed to the control unit 12. The sensors are initially positioned to coincide with the position of the markers $M_1$, $M_2$ (as shown in FIG. 1) such that both the sensors $S_1$, $S_2$ are triggered simultaneously during chain movement. The triggering of the sensors may be viewed on the visual display and/or may be heard via the audio unit output. When the chain portion between the sensors wears and is extended in length there will be a time delay between the triggering of the sensors $S_1$, $S_2$ by the respective markers $M_1$, $M_2$. At a chosen time the misalignment of the sensors to the markers is corrected by adjusting the position of the moveable sensor $S_2$ either manually or automatically so that the sensors are excited simultaneously again. The distance the sensor $S_2$ has to be moved from the initial position can be measured either manually or automatically (by, for example, a motor) to determine the elongation of the chain.

In the case of a fully automated system the processor in the control unit 12 continually compares the determined elongation value with a threshold value and may generate an audio and/or visual signal to alert an operator when the threshold is exceeded.

The apparatus can be used to monitor the wear of two chains that are running in parallel to drive a conveyor such as, for example, an escalator. In such an application each chain has at least two markers and a pair of sensors mounted in proximity thereto. The control unit receives signals from both sensors and is preprogrammed with the parameters relating to each chain. The chain wear is monitored in both chains by the control unit. The difference between the two calculated elongation values is determined and compared to a predetermined threshold value. If this value is exceeded the control unit issues a signal to the alarm signal generator and an appropriate alarm is sounded. This is particularly important in conveyors such as escalators where inequality of wear in the two chains may result in damage to the chain drive assembly or the escalator itself.

The embodiments of FIGS. 2 and 3 illustrate the use of the apparatus for monitoring wear in a lifting chain such as that used in a fork lift truck mast assembly. The chain 20 is arranged over a sheave or pulley at the top of the mast assembly. The two depending stretches of chain are connected respectively to a fixed anchor and the lifting carriage (neither of which is shown in the figures). Again portions of each chain are omitted in the figures. In FIG. 2 the monitoring apparatus has one fixed $S_1$ and one movable sensor $S_2$ as in the embodiment of FIG. 1, whereas in the embodiment of FIG. 3 the sensors $S_1$, $S_2$ are connected to a common support 23 so that they can be moved together. In each embodiment the sensors are initially positioned to coincide with the position of the markers $M_1$, $M_2$ as shown in the figures. As chain extends in use the movable sensor $S_2$ or the sensors $S_1$, $S_2$ on the common moveable support 23 is adjusted as before to ensure that the sensors $S_1$, $S_2$ are excited simultaneously. The distance moved is measured to determine the elongation value as described before.

The apparatus allows chain extension to be monitored continuously without stopping the drive and regardless of the speed or torque of the drive assembly. Any interaction with or adjustment to the apparatus during use of the chain drive is limited to those parts that are not connected to the chain 10 or 20 and so does not result in interruption of the operation of the chain drive.

It will be appreciated that numerous modifications to the above described design may be made without departing from the scope of the invention as defined in the appended claims. For example, the chain may be fitted with more than two markers and the chain elongation measured for different sections of the chain. An average chain wear may be calculated by the control unit from the measured values. Moreover, if a comparison is made of the determined elongation values this method enables identification of a section of chain that is wearing at a greater rate than other sections. Furthermore, the sensors may be of any suitable type for detecting the presence of a marker e.g. optical or laser based.

What is claimed is:

1. A method for automatically monitoring the wear of a chain when in operation in a chain drive assembly, comprising the steps of applying first and second markers to the chain at a predetermined distance apart along the length of the chain, positioning a first sensor adjacent to the chain to coincide with the position of the first marker, positioning a second sensor adjacent to the chain to coincide with the position of the second marker, the sensors being capable of generating signals in response to the detection of the proximity of the markers, operating the chain drive assembly so that the first and second sensors are initially triggered substantially simultaneously by said first and second markers respectively, detecting elongation of the chain by determining when a predetermined time delay occurs between the triggering of the first and second sensors by the respective markers, moving at least one of the sensors to a position where substantially simultaneous triggering of the sensors by the markers is resumed, and measuring the distance the sensor is moved to determine the elongation length of the chain.

2. A method according to claim 1, wherein only one of the sensors is moved.

3. A method according to claim 1, wherein both of the sensors are moved.

4. A method according to claim 3, wherein the sensors are moved together.

5. A method according to claim 1, wherein two or more parallel chains are used in the drive assembly, further comprising the steps of determining the elongation of each of the chains and comparing the elongation of each chain over time.

6. A method according to claim 1, further comprising the step of comparing the determined elongation length with a predetermined threshold value and issuing an alarm signal if the calculated value exceeds the threshold value.

7. A method according to claim 5, wherein two or more sets of first and second sensors are used to monitor wear in two or more chains, each of the chains having at least two markers.

8. A method according to claim 1, further comprising the step of monitoring the chain wear at different sections along a chain by using more than two markers, and determining the chain elongation at each of the different sections along the chain.

9. A method according to claim 8, further comprising the step of comparing the determined values of chain elongation at each of the different sections along the chain and issuing an alarm signal if one section of the chain is wearing more rapidly than another.

10. Chain wear monitoring apparatus for automatically monitoring the wear of a chain when in operation in a chain drive assembly, the apparatus comprising: first and second sensors mounted on a support, first and second markers disposed at a predetermined distance apart along the length of the chain, the first sensor being disposed adjacent to the first marker and the second sensor being disposed adjacent to the second marker, the sensors each being capable of generating a signal in response to the detection of the proximity of a marker, means for detecting a time delay between the first sensor being triggered by said first marker and the second sensor being triggered by said second marker, at least one of the sensors being movable to position where substantially simultaneous triggering of the sensors by the markers is resumed, and means for measuring the distance the sensor is moved so as to determine the elongation length of the chain.

11. Apparatus according to claim 10, wherein one sensor is fixed and the other is movable.

12. Apparatus according to claim 10, wherein both sensors are movable.

13. Apparatus according to claim 12, wherein both sensors are fixed to a common movable support so that they can be moved together.

* * * * *